United States Patent
Fukushima

(10) Patent No.: US 9,402,165 B2
(45) Date of Patent: Jul. 26, 2016

(54) RADIO COMMUNICATION TERMINAL AND SERVER

(75) Inventor: Masaru Fukushima, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1395 days.

(21) Appl. No.: 12/280,532

(22) PCT Filed: Feb. 23, 2007

(86) PCT No.: PCT/JP2007/053397
§ 371 (c)(1),
(2), (4) Date: Jan. 28, 2009

(87) PCT Pub. No.: WO2007/097421
PCT Pub. Date: Aug. 30, 2007

(65) Prior Publication Data
US 2010/0029314 A1    Feb. 4, 2010

(30) Foreign Application Priority Data

| Feb. 24, 2006 | (JP) | ................................ P2006-049060 |
| Apr. 13, 2006 | (JP) | ................................ P2006-111299 |

(51) Int. Cl.
| H04B 7/00 | (2006.01) |
| H04W 4/08 | (2009.01) |
| H04M 3/42 | (2006.01) |
| H04M 3/56 | (2006.01) |
| H04W 8/18 | (2009.01) |
| H04W 4/12 | (2009.01) |

(52) U.S. Cl.
CPC ............ *H04W 4/08* (2013.01); *H04M 3/42382* (2013.01); *H04M 3/56* (2013.01); *H04M 3/564* (2013.01); *H04W 8/186* (2013.01); *H04M 2203/654* (2013.01); *H04W 4/12* (2013.01)

(58) Field of Classification Search
USPC .......................................... 455/518
See application file for complete search history.

(56) References Cited

U.S. PATENT DOCUMENTS

| 5,940,756 A   * | 8/1999  | Sibecas et al. ............. 455/426.1 |
| 6,205,330 B1  * | 3/2001  | Winbladh ................... 455/426.1 |
| 2005/0186970 A1 * | 8/2005  | Yates et al. ................. 455/456.5 |
| 2005/0266869 A1 * | 12/2005 | Jung ............................. 455/518 |

FOREIGN PATENT DOCUMENTS

| JP | 2001-197562 | 7/2001 |
| JP | 2005-278109 | 10/2005 |
| WO | WO 02/01828 A1 | 1/2002 |

OTHER PUBLICATIONS

J. Rosenberg, et al. "SIP: Session Initiation Protocol" RFC 3261, pp. 1-269, Jun. 2002.

(Continued)

*Primary Examiner* — Ankur Jain
(74) *Attorney, Agent, or Firm* — Studebaker & Brackett PC

(57) ABSTRACT

A radio communication terminal according to the present invention is capable of performing group call by specifying multiple members. The radio communication terminal includes: a generator configured to generate a message during the group call; an acquisition unit configured to acquire information on a non-participating member of the group call among the specified members of the group call; and a transmitter configured to specify a destination for the message generated by the generator, on the basis of the information on the non-participating member acquired by the acquisition unit, and to transmit the message to the non-participating member.

16 Claims, 8 Drawing Sheets

(56) References Cited

OTHER PUBLICATIONS

Chinese language office action dated Feb. 11, 2011 and its English language translation for corresponding Chinese application 200780006568.2

Japanese language office action dated Jan. 28, 2011 and its English language translation for corresponding Japanese application 2006111299.

Japanese language office action dated May 10, 2011 and its English language translation for corresponding Japanese application 2006111299.

* cited by examiner

RADIO COMMUNICATION TERMINAL AND SERVER

CROSS-REFERENCE TO THE RELATED APPLICATIONS

This application is a national stage of international application No. PCT/JP2007/053397 filed Feb. 23, 2007, which also claims benefit of priority under 35 USC 119 to Japanese Patent Application No. 2006-049060 filed Feb. 24, 2006 and Japanese Patent Application No. 2006-111299 filed Apr. 13, 2006, the entire contents of all of which are incorporated herein by reference.

TECHNICAL FIELD

The present invention relates to a radio communication terminal and a server capable of performing group call by specifying multiple members.

BACKGROUND ART

In recent years, IP-related protocol set including IP (Internet Protocol), SIP (Session Initiation Protocol) which performs call control between radio communication terminals, and the like has been used in a radio communication network such as a mobile communications network (see, RFC3261 "SIP: Session Initiation Protocol").

In addition, in a mobile communication network using the protocol set, "group call" has been realized in which a radio communication terminal (for example, a cellular phone terminal) calls multiple different radio communication terminals to form a group of the radio communication terminals. In the group call, radio communication terminals participating in a group can perform voice communications, and transmit and receive messages (for example, chat) with other radio communication terminals participating in the group.

DISCLOSURE OF THE INVENTION

In the above-mentioned group call, there are radio communication terminals that cannot participate in group call because being outside the communication area, and also other radio communication terminals that intentionally do not participate in the group call because of the situation of the user. Further, there are radio communication terminals that leave the group call before the end of a group call, or that participate the group call after the start of a group call.

Accordingly, in some cases, the user of a radio communication terminal participating in the group call transmits a message to a radio communication terminal not participating in the group call (including the case of leaving the group call in the middle of group call) (such a terminal simply referred to as "non-participating terminal" below as needed), the message including the contents of the group call such as the above-mentioned chat messages and the like (such a message simply referred to as "a message addressed to a non-participating terminal" below as needed) by additionally using applications such as an email or an SMS (Short Message Service).

However, since each of the users participating in the group call determines whether or not to transmit a message addressed to a non-participating terminal and the contents of the message. Therefore, a non-participating terminal in some cases receives multiple messages including the same content from multiple radio communication terminals participating in the group call. The received messages regarding the same group call may be inconsistent with each other because the creators of the messages are different from one another.

As a result, a problem arises that the user of the non-participating terminal repeatedly reading a message containing the same information, or fails to have a correct understanding of the contents of the group call if the contents of the multiple messages are inconsistent with each other.

Moreover, the user of a radio communication terminal that transmits a message to a non-participating terminal need to remember which user is not participating in the group call, or estimate non-participants from a member list of the group call, thereafter start up an application for email or SMS (Short Message Service), and then manually set a destination. Thus, the user is required to perform various operations, and may consequently forget to send a message to some of the non-participating terminals (may fail to include some of the non-participating terminals as destinations). Also, the users may possibly transmit wrong information, as the message is sent after the termination of the group call session. Furthermore, they also need to take a lot of trouble with searching out and setting the address and phone number of the destination user to transmit the message via an email, an SMS, or the like.

The present invention has been made in view of the above-mentioned problems. An object of the present invention is to provide a radio communication terminal and a server that are capable of easily and conveniently transmitting a message addressed to a non-participating terminal not participating in group call.

In order to solve the above-mentioned problem, in accordance with a first feature of the present invention, there is provided a radio communication terminal capable of performing group call by specifying a plurality of members, comprising: a generator configured to generate a message during the group call; an acquisition unit configured to acquire information on a non-participating member of group call among the specified members of the group call; and a transmitter configured to specify a destination for the message generated by the generator on the basis of the information on the non-participating member acquired by the acquisition unit, and to transmit the message to the non-participating member.

In the first feature of the present invention, the acquisition unit may acquire information on a non-participating member when detecting a call end event of the group call, and the transmitter may set a destination for the message generated by the generator, on the basis of the information on the non-participating member acquired by the acquisition unit, and transmit the message to the non-participating member.

In the first feature of the present invention, the acquisition unit may acquire information on a non-participating member when receiving an instruction to transmit the message, and the transmitter may set a destination for the message generated by the generator on the basis of the information on the non-participating member acquired by the acquisition unit, and transmit the message to the non-participating member.

In the first feature of the present invention, when the acquisition unit acquires information on a non-participating member and the transmitter sets a destination for the message generated by the generator on the basis of the information on the non-participating member acquired by the acquisition unit, prior to detection of a call end event of the group call, the acquisition unit may acquire information on a non-participating member again when transmitting the message to the non-participating member, and display information on a change between the set destination and the newly acquired destination by use of a display unit if there is a change.

In the first feature of the present invention, when the acquisition unit acquires information on a non-participating member and the transmitter sets a destination for the message generated by the generator on the basis of the information on the non-participating member acquired by the acquisition unit, prior to receipt of an instruction to transmit the message, the acquisition unit may acquire information on a non-participating member again when transmitting the message to the non-participating member, and display information on a change between the set destination and the newly acquired destination by use of a display unit if there is a change.

In accordance with a second feature of the present invention, there is provided a server that enables group call of a plurality of specified members, comprising: a storage unit configured to store a message generated during group call; an acquisition unit configured to acquire information on a non-participating member of group call among the specified members of the group call; and a transmitter configured to set a destination for the message stored in the storage unit, on the basis of the information on the non-participating member acquired by the acquisition unit, and to transmit the message to the non-participating member.

In the second feature of the present invention, the acquisition unit may acquire the information on the non-participating member when detecting a call end event of the group call, and the transmitter may set a destination for the message stored in the storage unit, on the basis of the information on the non-participating member acquired by the acquisition unit, and transmit the message to the non-participating member.

In the second feature of the present invention, the acquisition unit may acquire the information on the non-participating member upon receipt of an instruction to transmit the message, and the transmitter may set a destination for the message stored in the storage unit, on the basis of the information on the non-participating member acquired by the acquisition unit, and transmit the message to the non-participating member.

According to the features of the present invention, it is possible to provide a radio communication terminal and a server which can transmit a message addressed to a non-participating terminal to a non-participating terminal which is not participating in group call easily and conveniently.

BEST MODE FOR CARRYING OUT THE INVENTION

First Embodiment (Schematic Configuration of Radio Communication Network)

The schematic configuration of a radio communication network according to a first embodiment of the present invention will now be described with reference to FIG. 1.

In the description, "Group call" includes VoIP (Voice over IP) communications, non-voice communications such as chat, and communications formed by combining voice communications, such as video telephone communications and video conference communications, and non-voice communications, among multiple radio communication terminals.

Figure 1:
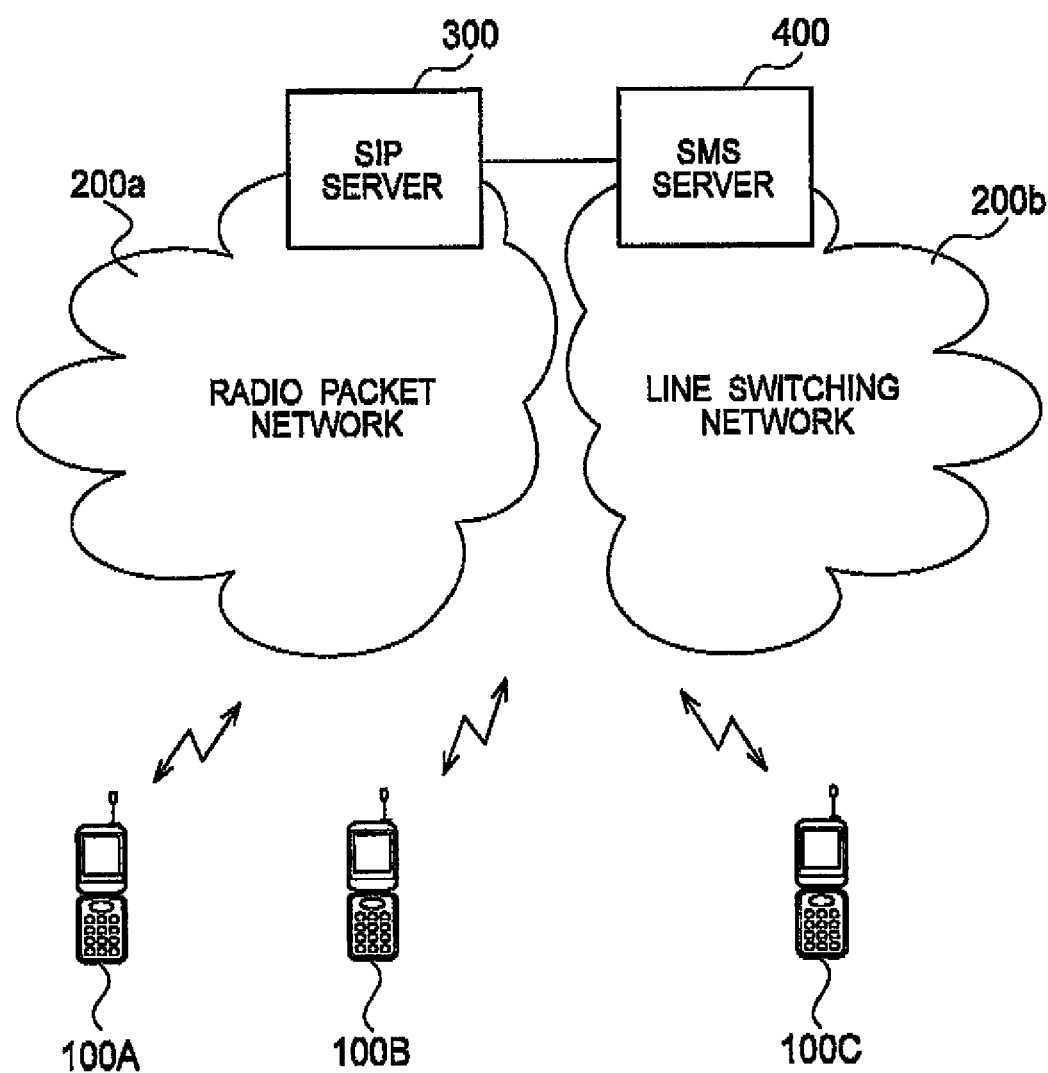
FIG. 1 is a schematic configuration view of an entire radio communication network according to a first embodiment of the present invention.

As shown in FIG. 1, the radio communication network includes an SIP server 300 and an SMS (Short Message Service) server 400. Moreover, radio communication terminals 100A, 100B and 100C according to the embodiment are configured to be connectable to the SIP server 300 via a radio packet network 200a that transmits an IP packet. The radio communication terminals 100A, 100B and 100C are configured to be connectable to the SMS server 400 via a line switching network 200b.

In the description hereinafter, the radio communication terminals 100A and 100B are assumed to be radio communication terminals participating in group call, and the radio communication terminal 100C is assumed to be a radio communication terminal not participating in group call (non-participating terminal).

The SIP server 300 controls group call among the radio communication terminals 100A to 100C on the basis of SIP. Meanwhile, the SIP server 300 configures a server enables group call by multiple members specified.

The SMS server 400 provides a message service (Short Message Service).

(Configuration of Radio Communication Terminal According to First Embodiment)

The configuration of the radio communication terminal 100A used in a radio communication network will now be described with reference to FIG. 2.

Figure 2:
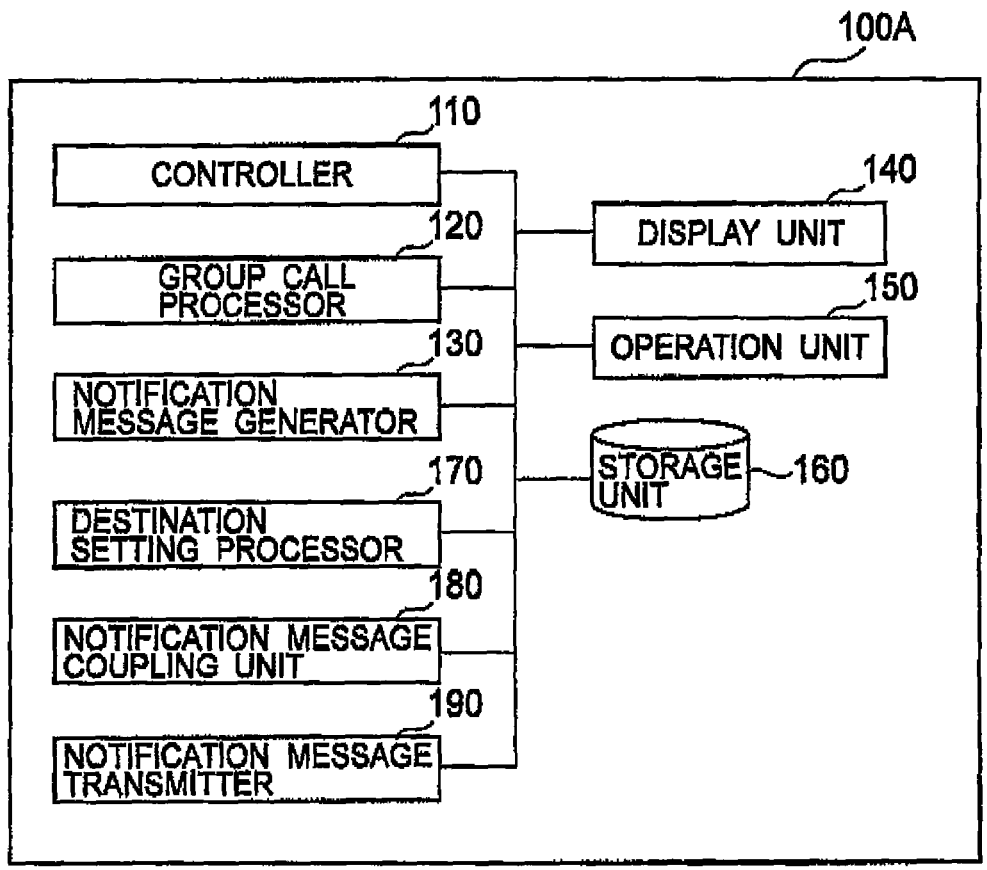
FIG. 2 is a block configuration diagram of a radio communication terminal according to the first embodiment of the present invention.

As shown in FIG. 2, the radio communication terminal 100A includes a controller 110, a group call processor 120, a notification message generator 130, a display unit 140, an operating unit 150, a storage unit 160, a destination setting processor 170, a notification message coupling unit 180 and a notification message transmitter 190.

The radio communication terminals 100B and 100C also have the same functional block configuration as the radio communication terminal 100A. Hereinafter, the part related to the present invention will be mainly described. Accordingly, it should be noted that the radio communication terminal 100A may include a logical block (such as a power supply unit) not shown or not described herein that is essential to accomplish a function of the radio communication terminal 100A.

The controller 110 controls each of the functional blocks of the radio communication terminal 100.

Specifically, the controller 110 detects that the radio communication terminal 100A initiates group call. The controller 110 is capable of starting up the notification message generator 130 when detecting that the radio communication terminal 100A initiates group call.

The controller 110 also starts up the notification message coupling unit 180 when the operating unit 150 receives a transmission operation from a user that instructs the operating unit 150 to transmit a notification message to a non-participating terminal, or when the controller 110 detects a call end event (end of group call when the radio communication terminal 100A issues a BYE request or when the radio communication terminal 100A receives a BYE request issued by the radio communication terminal 100B, for example).

The group call processor 120 instructs the SIP server 300 to transmit a notification message. The group call processor 120 receives a notification message from the radio communication terminal 100B during group call via the SIP server 300. In this embodiment, the group call processor 120 configures a transmitting and receiving unit.

In addition, the group call processor 120 specifies group members to generate a group list, perform call processing based on the group members and call-out processing for the radio communication terminals in the group, in order to perform group call.

Figure 3:
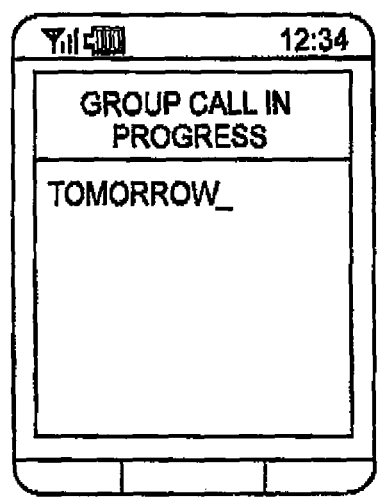
FIG. 3 is a view showing an example of a notification message creation screen displayed by the radio communication terminal according to the first embodiment of the present invention.

The notification message generator 130 generates, for example, a notification message creation screen as shown in FIG. 3 in response to an instruction from the controller 110, and displays the screen on the display unit 140. The notification message generator 130 also generates a notification message (message) for the radio communication terminal 100C on the basis of the information acquired from the operating unit 150 while displaying the notification message creation screen on the display unit 140. The notification message generator 130 also re-generates the generated message into a notification message in accordance with an SMS or an email. In this embodiment, the notification message generator 130 configures a generator that generates a message during group call.

The display unit 140 is formed of a small display device, and displays various information. More specifically, the display unit 140 displays a notification message creation screen generated by the notification message generator 130. The display unit 140 also displays a destination selection screen generated by the destination setting processor 170.

The operating unit 150 is formed of various keys that are operated by a user of the radio communication terminal 100, and a vibrator.

More specifically, the operating unit 150 specifies group members and acquires information inputted by a user through a notification message creation screen displayed on the display unit 140. The operating unit 150 also receives a transmission operation that instructs the operating unit 150 to transmit a notification message from a user to a non-participating terminal.

The storage unit 160 stores notification messages generated by the notification message generator 130, notification messages received by the group call processor 120, lists of group members, address book information, and the like.

The destination setting processor 170 acquires non-participating information (hereinafter referred to as "a list of non-participants" (may be described as "a list of non-participating terminals" or the like)) from the SIP server 300 in response to an instruction from the controller 110.

Here, non-participating information is information on radio communication terminals (members) that are not participating in group call among the radio communication terminals in a group list consisting of members specified as the group to the group call by the radio communication terminal 100A. Incidentally, the information may be a list in which non-participants can be identified from all group lists.

Figure 4:
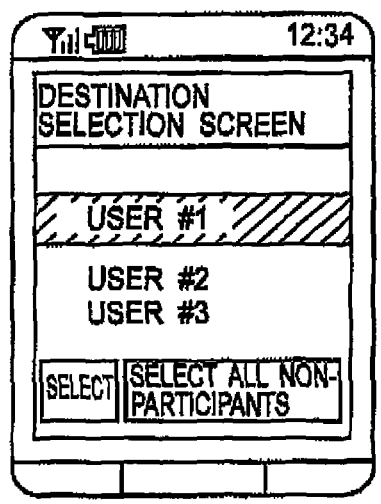
FIG. 4 is a view showing an example of a destination selection screen displayed by the radio communication terminal according to the first embodiment of the present invention.

The destination setting processor 170 also generates a destination selection screen as shown in FIG. 4 on the basis of a list of non-participants acquired from the SIP server 300 and display the screen on the display unit 140. The destination setting processor 170 set a destination for a notification message on the basis of a user's selection through the destination selection screen displayed on the display unit 140. Here, the information on the destination may be included in the non-participants information acquired from the SIP server 300, or may also be set in reference to information stored in the storage unit 160 on the basis of the identification information indicated in the non-participants information.

In this embodiment, the destination setting processor 170 configures an acquisition unit that acquires information on members not participating in the group call among the specified members of the group call.

Figure 5:
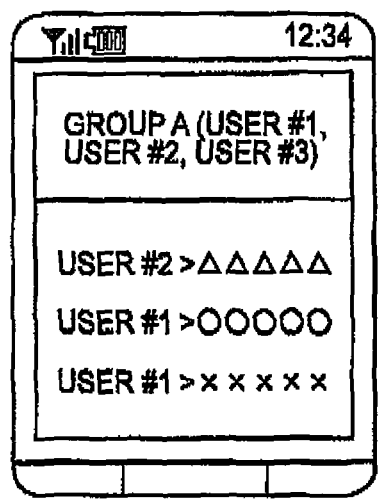
FIG. 5 is a view showing an example of a display screen showing a coupled message according to the first embodiment of the present invention.

The notification message coupling unit 180 couples multiple messages stored in the storage unit 160 to generate a notification message as needed in response to an instruction from the controller 110. More specifically, the notification message coupling unit 180 couples, for example, as shown in FIG. 5, notification messages including identification information of a group being in communications in a chronological order or an order sorted by user.

The notification message transmitter 190 transmits a notification message on the basis of the destination set by the destination setting processor 170 by using short message service. A message with more characters than that allowed in short message service may be sent by dividing the message into multiple blocks, or by changing to email.

In this embodiment, the destination setting processor 170 and the notification message transmitter 190 configure a transmitter that is configured to specify a destination for a message generated by a generator (notification message) on the basis of the information on the non-participating member acquired by the acquisition unit to thereby transmit the message to the non-participating member.

In this embodiment, a message may be sent in such a manner that the acquisition unit acquires information on a non-participating member when detecting a call end event of group call, and then the destination setting processor 170 and the notification message transmitter 190 specify a destination for the message generated by the generator on the basis of the information on the non-participating member acquired by the acquisition unit to transmit the message to the non-participating member.

In this embodiment, a message may be sent in such a manner that the acquisition unit acquires information on a non-participating member when receiving an instruction to transmit the message, and then the destination setting processor 170 and the notification message transmitter 190 specify a destination for the message generated by the generator on the basis of the information on the non-participating member acquired by the acquisition unit to transmit the message to the non-participating member.

In this embodiment, if the acquisition unit acquires information on a non-participating member and the destination setting processor 170 and the notification message transmitter 190 specify a destination for the message generated by the generator on the basis of the information on the non-participating member acquired, by the acquisition unit prior to detection of a call end event of group call, it may be configured such that the acquisition unit may acquire information on a non-participating member again to check if there is a change between the set destination and the acquired destination, and may display information on the change if there is any upon transmitting the message to the non-participating member.

In this embodiment, if the acquisition unit acquires information on a non-participating member and the destination setting processor 170 and the notification message transmitter 190 specify a destination for the message generated by the generator on the basis of the information on the non-participating member acquired by the acquisition unit prior to receipt of an instruction to transmit messages, it may be configured such that the acquisition unit may acquire information on a non-participating member again to check if there is a change between the set destination and the acquired destination, and may display information on the change if there is any upon transmitting the message to the non-participating member.

(Communications Method According to First Embodiment)

A communications method according to the first embodiment will be described below in reference to FIGS. 6 to 8.

Figure 6:
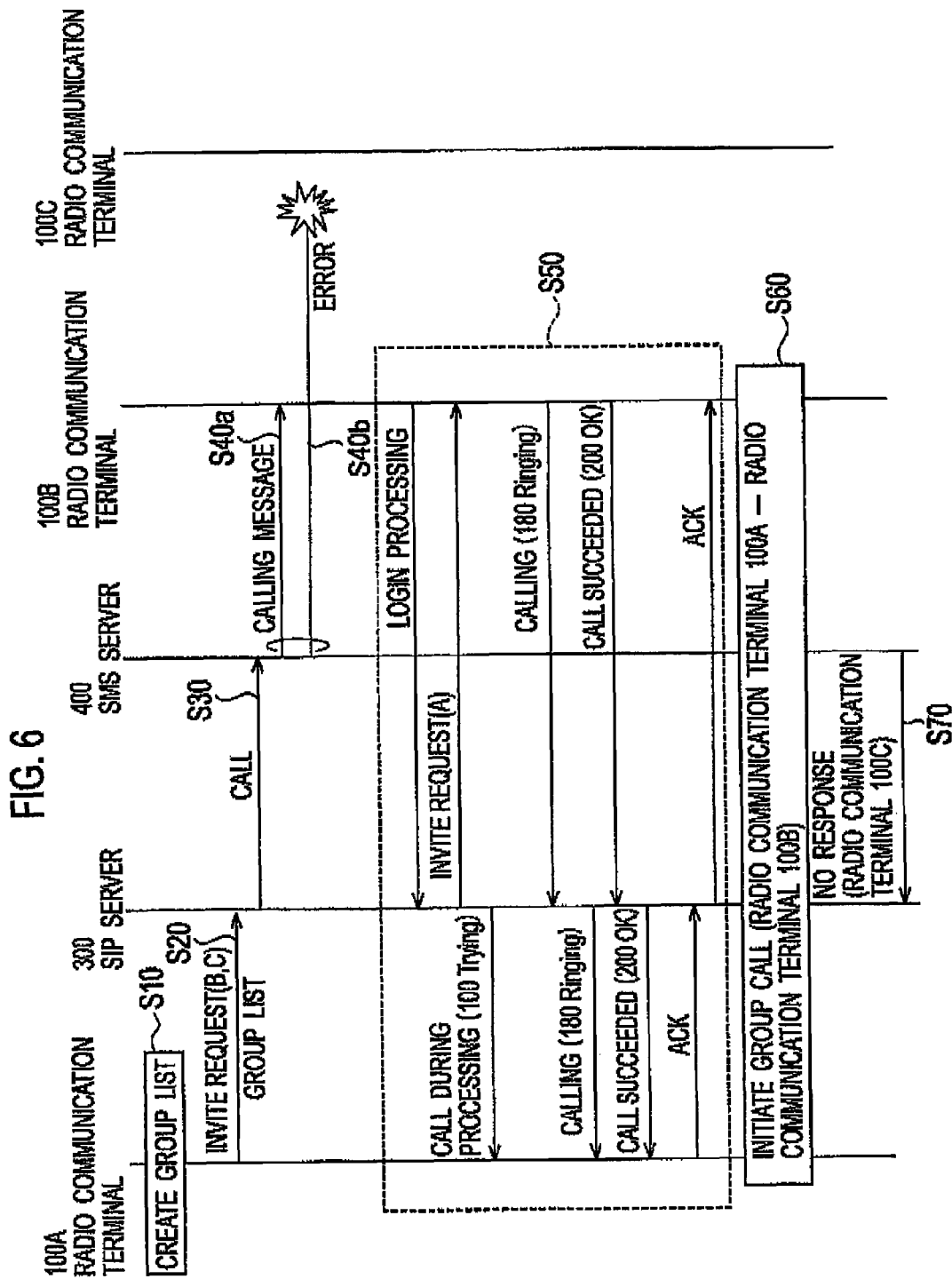
FIG. 6 is a diagram showing a communications method of the radio communication terminal according to the first embodiment of the present invention.

FIG. 6 is a diagram showing a sequence in which a radio communication terminal 100A calls out radio communication terminals 100B and 100C via the SIP server 300 to form a group.

As shown in FIG. 6, in step S10, the radio communication terminal 100A forms a group list including the identification information of the radio communication terminals 100B and 100C.

In step S20, the radio communication terminal 100A transmits, to the SIP server 300, a call request (INVITE Request (B, C)) for the radio communication terminals 100B and 100C.

In step S30, the SIP server 300 calls out the SMS server 400 and notifies that the SIP server 300 has received the above-mentioned call request (INVITE Request (B, C)) for the radio communication terminals 100B and 100C from the radio communication terminal 100A.

In step S40a, the SMS server 400 generates a call message (SMS) for the radio communication terminal 100B in response to the notification from the SIP server 300, and transmits the message to the radio communication terminal 100B.

Similarly, in step S40b, the SMS server 400 generates a call message (SMS) for the radio communication terminal 100C in response to the notification from the SIP server 300, and attempts to transmit the message to the radio communication terminal 100C and fails.

In step S50, the radio communication terminal 100B receives the call message (SMS) transmitted from the SMS server 400 in step S40a and executes processing to initiate group call via the SIP server 300.

The processing for the radio communication terminal 100B to Initiate group call includes: a login process to the SIP server; a receiving process of INVITE REQUEST; a calling process for a user of the radio communication terminal 100B; and the like.

In step S60, when the user of the radio communication terminal 100B responds to the calling, group call is initiated between the radio communication terminal 100A and the radio communication terminal 100B. In this case, the radio communication terminals 100A and 100B are radio communication terminals that are participating in the group call.

In step S70, the SMS server 400 detects that the radio communication terminal 100C does not respond to the call message (SMS) transmitted to the radio communication terminal 100C in step S40b and notifies the SIP server 300 that the radio communication terminal 100C does not respond. In this case, the radio communication terminal 100C is a non-participating terminal.

Note that non-participating terminals include radio communication terminals which receive an INVITE REQUEST and call the users but the users do not respond (not shown). In addition, there are radio communication terminals that leave the group before the group call ends or participate the group after the group call is initiated.

Next, an example of notification message transmission by the radio communication terminal 100A according to the embodiment will be described in reference to FIGS. 7 and 8, Hereinafter, the radio communication terminal 100A and the radio communication terminal 100B are assumed to be radio communication terminals that are participating in group call and the radio communication terminal 100C is assumed to be a non-participating terminal that is not participating in the group call.

Figure 7:
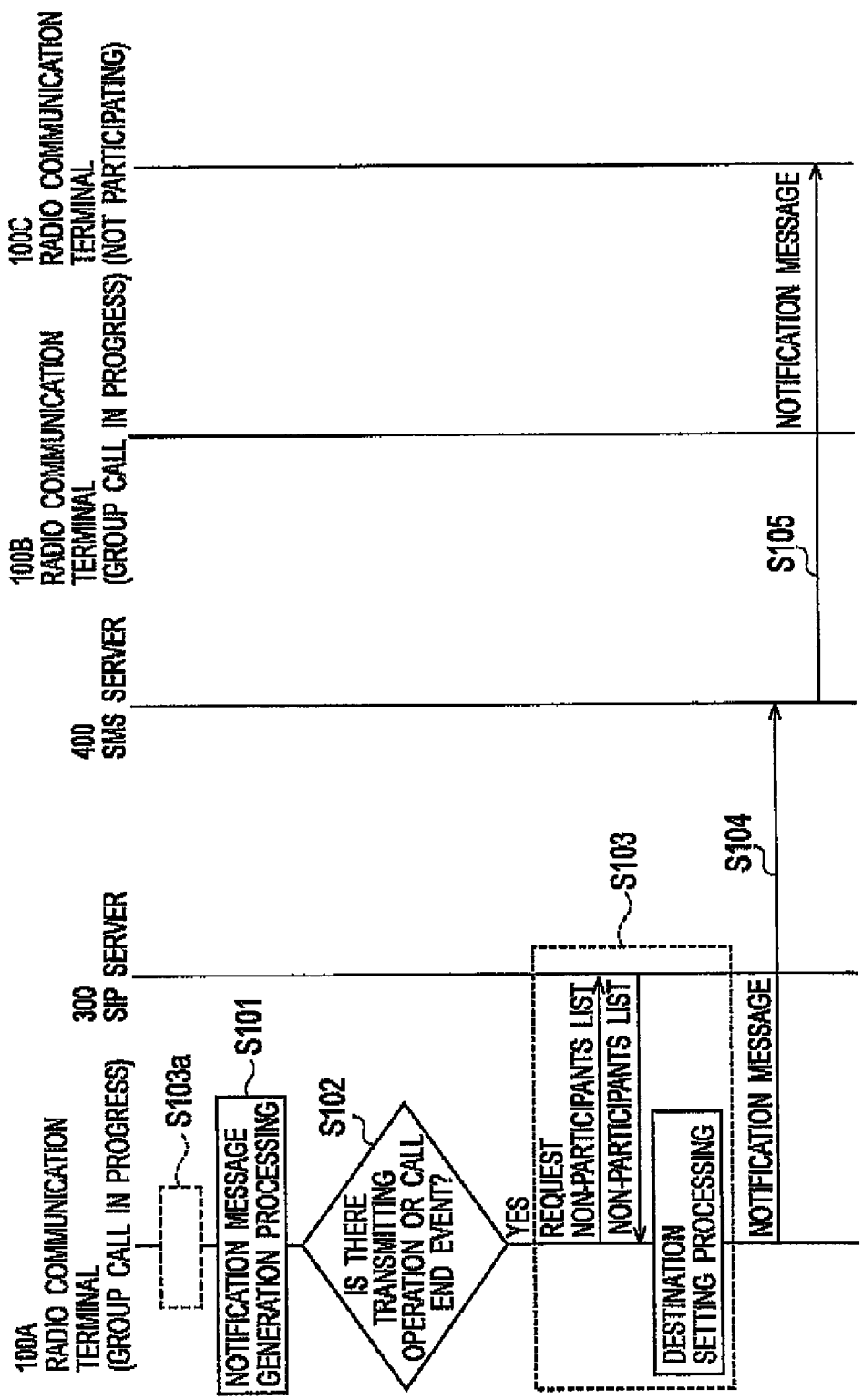
FIG. 7 is a diagram showing a transmitting method of a notification message from the radio communication terminal according to the first embodiment of the present invention.

FIG. 7 is an example in which the radio communication terminal 100A generates a notification message and transmits the generated notification message to the radio communication terminal 100C.

As shown in FIG. 7, in step S101, the radio communication terminal 100A executes notification message generation processing. More specifically, the radio communication terminal 100A generates a notification message creation screen and displays the generated notification message creation screen on the display unit 140. The radio communication terminal 100A generates a notification message for the radio communication terminal 100C on the basis of the information acquired from the operating unit 150 while displaying the notification message creation screen.

Step S102 is a step of detecting a trigger to transmit a notification message generated for the radio communication terminal 100C. More specifically, when the radio communication terminal 100A receives a transmission operation instructing notification message transmission to a non-participating terminal (for example, the radio communication terminal 100C) from a user via the operating unit 150, or when the controller 110 detects the above mentioned call end event, the operation proceeds to step S103.

In step S103, the radio communication terminal 100A executes destination setting processing. More specifically, the radio communication terminal 100A requests a list of non-participants to the SIP server 300. The SIP server 300 transmits the non-participants list to the radio communication terminal 100A in response to the request for the non-participants list from the radio communication terminal 100A.

The radio communication terminal 100A also generates a destination selection screen on the basis of the non-participating list and displays the generated destination selection screen on the display unit 140. The radio communication terminal 100A sets the destination for the notification message generated in step S101 on the basis of a selection result by the user through the destination selection screen.

Note that, such destination setting processing may be performed also in step S103a, in addition to performing the processing in step S103. In other words, the radio communication terminal 100A may be configured to set a destination in step S103a and then confirm the destination again in step S103. Here, when a destination is set in step S103a, it may be configured to compare the destination with the destination acquired in step S103, and if there is a difference in the destination, to display the difference for resetting upon transmitting a message. This allows for transmitting the notification message to the non-participating member set on the basis of newer information at the time of transmitting the message than the information previously acquired.

Figure 8:
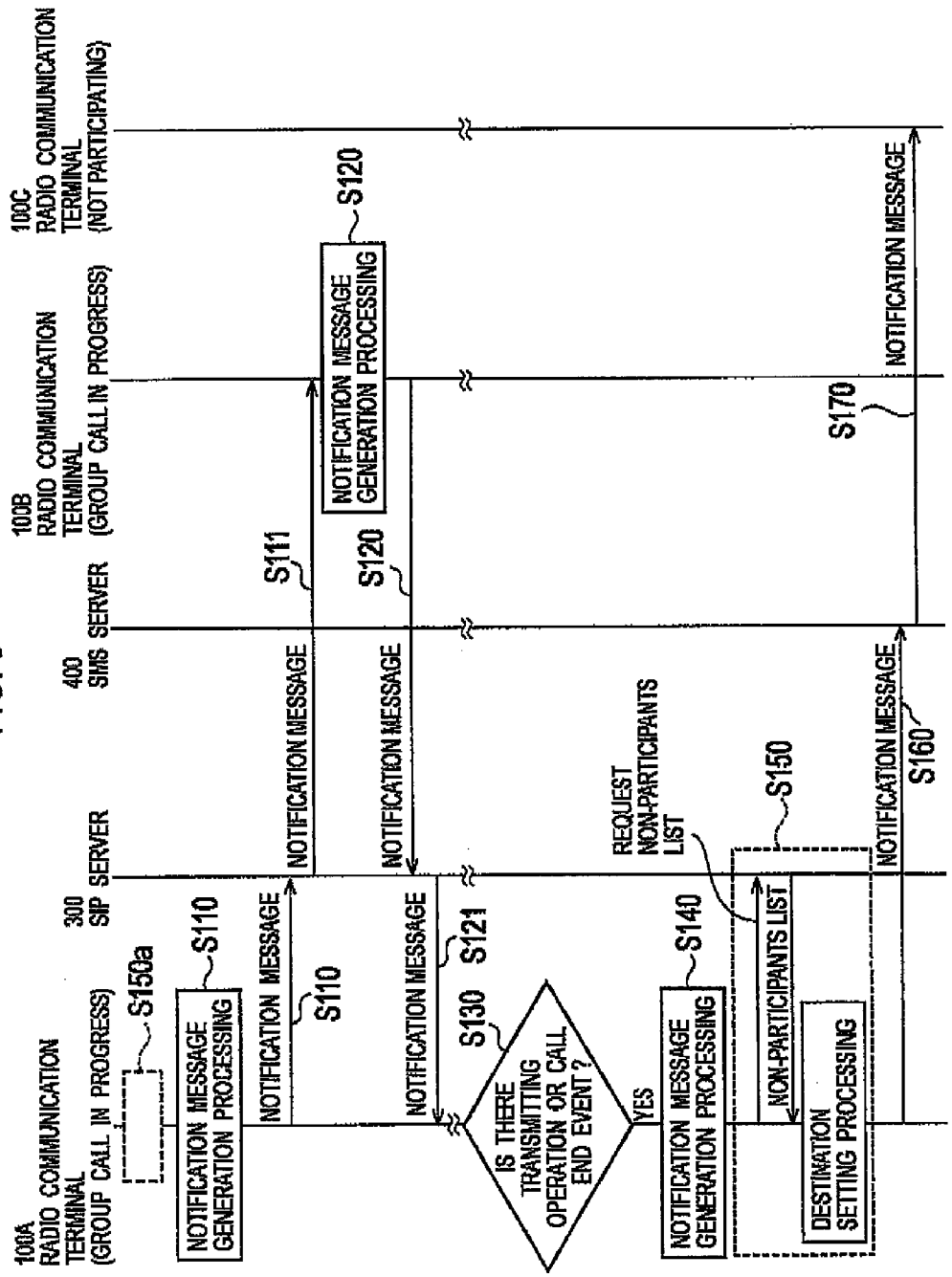
FIG. 8 is a diagram showing a transmitting method of a notification message from the radio communication terminal according to the first embodiment of the present invention.

FIG. 8 is an example in which the radio communication terminal 100A and the radio communication terminal 100B generate a notification message and the radio communication terminal 100A transmits the notification message to the radio communication terminal 100C.

As shown in FIG. 8, in step S110, the radio communication terminal 100A executes notification message generation processing and transmits the generated notification message to the SIP server 300.

More specifically, the radio communication terminal 100A generates a notification message creation screen and displays the generated notification message creation screen on the display unit 140. The radio communication terminal 100A generates a notification message for the radio communication terminal 100C on the basis of the information acquired from the operating unit 150 while displaying the notification message creation screen, and then transmits the generated notification message to the SIP server 300. This notification message is stored in a storage unit 340, which is to be described later, of the SIP server 300. Any radio communication terminal being in the group call is able to acquire and display messages stored in the SIP server 300 upon request to the SIP server 300 (step S111).

In step S120, the radio communication terminal 100B executes notification message generation processing in the same manner as Step S110, and transmits the generated notification message to the SIP server 300. The SIP server 300 stores the received notification message in the storage unit 340.

Similarly, the radio communication terminal 100A is able to acquire and display the notification message added by the radio communication terminal 100B from the SIP server 300 (step S121). Here, the notification message acquired from the SIP server 300 is stored in the storage unit 160 of the radio communication terminal 100A.

Step S130 is a step of detecting a trigger to transmit the generated notification message for the radio communication terminal 100C. More specifically, when the radio communication terminal 100A receives a transmission operation instructing notification message transmission to a non-participating terminal from a user via the operating unit 150, or detects the above-mentioned call end event, the operation proceeds to step S140.

In step S140, the radio communication terminal 100A executes notification message generation processing.

More specifically, the radio communication terminal 100A generates a notification message in a manner that the notification message stored in the storage unit 160 or the storage unit 340 can be transmitted using a message service such as an SMS and an email. Here, the notification message may be generated by acquiring a notification message from the SIP server 300 in response to the above-mentioned trigger or by using the notification message being displayed at the time, in addition, if messages are generated by multiple radio communication terminals, the notification message is preferably generated in a manner that the messages generated by different radio communication terminals are coupled and the radio communication terminals by which the respective messages have been generated can be identified.

In step S150, the radio communication terminal 100A executes destination setting processing.

More specifically, the radio communication terminal 100A requests a non-participants list to the SIP server 300. The SIP server 300 transmits the non-participants list to the radio communication terminal 100A in response to the request for the non-participants list from the radio communication terminal 100A.

The radio communication terminal 100A executes destination setting processing. More specifically, the radio communication terminal 100A generates a destination selection screen on the basis of the non-participating list and displays the screen on the display unit 140. The radio communication terminal 100A sets the destination for the notification message generated in step S140 on the basis of a selection result by a user through the destination selection screen.

Note that, such destination setting processing may be performed also in step S150a, in addition to performing the processing in step S150. Here, when a destination is set in step S150a, it may be configured to compare the destination with the destination acquired in step S150, and if there is a difference in the destination, to display the difference for resetting upon transmitting a message. This allows for transmitting the notification message to the non-participating member set on the basis of newer information at the time of transmitting the message than the information previously acquired.

In step S160, the radio communication terminal 100A transmits the notification message to the SMS server 400 via Short Mail Service. The SMS server 400 transmits the notification message received from the radio communication terminal 100A to the radio communication terminal 100C via Short Mail Service.

(Effects and Advantages According to First Embodiment)

According to the radio communication network related to the first embodiment, a message for a non-participating terminal which is not participating in group call can be delivered reliably by the fact that the radio communication terminal 100A can acquire a non-participants list from the SIP server 300.

In addition, since the messages for the non-participating terminal from the multiple radio communication terminals which are participating in the group call are coupled, the user of the non-participating terminal can precisely understand the contents of the message transmitted from the multiple participants.

Second Embodiment

A radio communication network and a communications method according to a second embodiment of the present Invention will now be described with reference to FIGS. 9 and 10. Hereinafter, the differences between the radio communication network and the communications method according to the second embodiment of the present invention and the above-mentioned radio communication network and the communications method according to the first embodiment of the present invention will be mainly described.

The radio communication network according to the second embodiment of the present invention differs from that of the first embodiment in that the notification message generation processing and the notification message transmitting processing are performed by an SIP server 300, the notification message generation processing and the notification message transmitting processing being performed by the radio communication terminal 100A in the radio communication network according to the first embodiment. In the second embodiment of the present invention, the SIP server 300 configures a delivery server.

(Configuration of SIP Server (Server) According to Second Embodiment)

The configuration of the SIP server 300 used in the radio communication network will now be described in reference to FIG. 9. Note that, as mentioned above, the configuration of the SIP server 300 can also be applied to the SIP server 300 according to the first embodiment.

Figure 9:
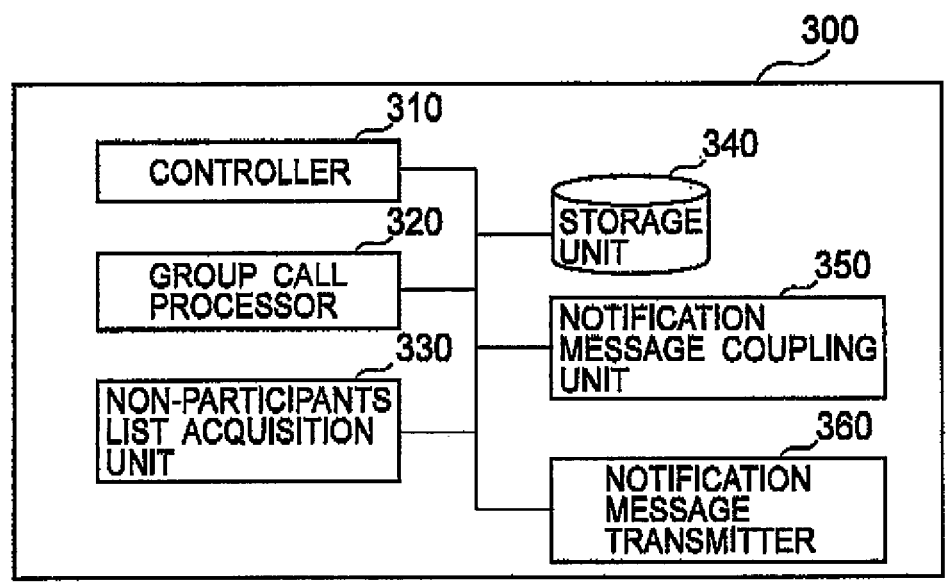
FIG. 9 is a block configuration diagram of a call control server according to a second embodiment of the present invention.

As shown in FIG. 9, the SIP server 300 includes a controller 310, a group call processor 320, a non-participants list acquisition unit 330, a storage unit 340, a notification message coupling unit 350 and a notification message transmitter 360.

The controller 310 controls each of the functional blocks of the SIP server 300. More specifically, the controller 310 actuates the notification message coupling unit 350 when detecting the reception of a notification message transmitting request from a radio communication terminal 100A or detecting a call end event (end of group call when receiving a BYE request from the radio communication terminal 100A or receiving a BYE request from a radio communication terminal 100B).

The group call processor 320 receives a message for a radio communication terminal participating in group call transmitted from a radio communication terminal. In this embodiment, the group call processor 320 configures a receiver.

The group call processor 320 also performs tasks such as calling a radio communication terminal in the group.

The non-participants list acquisition unit 330 acquires a non-participants list, which is a list of radio communication terminals not participating in group call, among the radio communication terminals listed in a group list received from the radio communication terminal 100A upon a call request. Here, the non-participants list acquisition unit 330 may be configured to generate a list of non-participants.

In this embodiment, the non-participants list acquisition unit 330 configures an acquisition unit configured to acquire information on a non-participating member of group call among the multiple members specified to the group call.

The storage unit 340 stores the notification message received by the group call processor 320. The storage unit 340 configures a storage unit configured to store a message generated during group call.

The notification message coupling unit 350 couples notification messages stored in the storage unit 340 in response to an instruction by the controller 110. More specifically, the notification message coupling unit 350 couples notification messages including identification data of a group being in communications in a chronological order or an order sorted by user names.

The notification message transmitter 360 transmits the coupled message coupled by the notification message coupling unit 350 as a notification message to the non-participating terminal by using an SMS or an email or the like on the basis of the list of non-participants acquired by the non-participants list acquisition unit 330.

In this embodiment, the notification message transmitter 360 configures a transmitter configures to specify a destination for the message stored in the storage unit on the basis of the information on the non-participating member acquired by the acquisition unit to transmit the message to the non-participating member.

In this embodiment, a message may be sent in such a manner that the acquisition unit acquires information on a non-participating member upon detection of a call end event of group call, and then the notification message transmitter 360 specifies a destination for the message stored in the storage unit on the basis of the information on the non-participating member acquired by the acquisition unit to transmit the message to the non-participating member.

In this embodiment, a message may be sent in such a manner that the acquisition unit acquires information on a non-participating member upon receipt of an instruction to transmit the message, and then the notification message transmitter 360 specifies a destination for the message stored in the storage unit on the basis of the information on the non-participating member acquired by the acquisition unit to transmit the message to the non-participating member.

(Communications Control Method According to Second Embodiment)

A communications method according to the second embodiment will be described in reference to FIG. 10.

Figure 10:
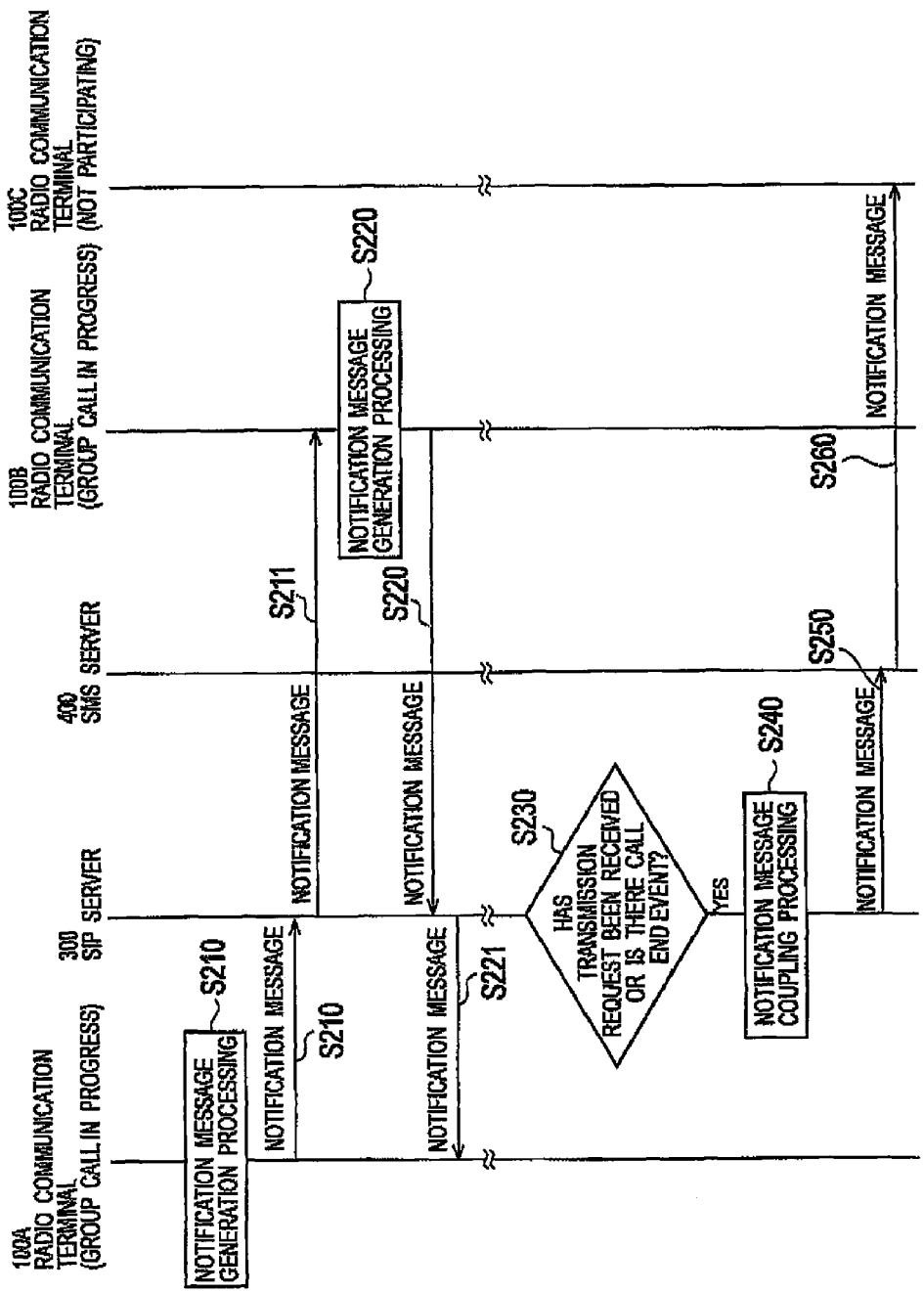
FIG. 10 is a diagram showing a message delivery method of the server according to the second embodiment of the present invention.

FIG. 10 shows an example in which the radio communication terminal 100A transmits a notification message to a radio communication terminal 100C that is not participating in group call when the radio communication terminal 100A and the radio communication terminal 100B are in communication in the group call.

Note that steps S210 to S221 are the same as the steps S110 to S121 in the first embodiment, and thus the description thereof will be omitted.

Step S230 is a step of detecting a trigger to transmit a notification message generated for the radio communication terminal 100C. More specifically, when the SIP server 300 receives a notification message send request from the radio communication terminal 100A or detects a call end event, the operation proceeds to step S240.

In step S240, the SIP server 300 performs notification message coupling processing. Note that, this processing may be skipped when a coupling task is performed every time a new notification message is added from each of the radio communication terminals.

In step S250, the SIP server 300 acquires a list of non-participants and set a destination for the notification message that has been coupled in step S240.

The SIP server also transmits the coupled notification message to an SMS server 400 via Short Mail Service. The SMS server 400 transmits the notification message received from the SIP server 300 to the radio communication terminal 100C.

(Effects and Advantages)

According to the radio communication network related to the second embodiment, the load on the radio communication terminal 100A is reduced as compared to the first embodiment since the SIP server 300 transmits a message for a non-participating terminal to a non-participating terminal that is not participating in group call. In addition, since the destination is set by the SIP server 300, the message can be transmitted to the non-participating terminal more reliably without being affected by a time lag and the like as compared to the case where the address is acquired and set by the radio communication terminal 100A.

Other Embodiment

Although the case where an SIP is used as the communication protocol has been described in the first embodiment and the second embodiment, the present invention is not limited to such a case. As long as the operations in the first embodiment and the second embodiment may be carried out, the present invention is also applicable to the case where such other communication protocol is used.

Hereinabove, an example of the present invention has been described. However, illustrated herein is merely a specific example, and the example does not particularly limit the present invention. The design of the specific configuration of each unit may be modified as needed. Moreover, the configurations of each of the embodiments and modified examples may also be used in combination. In addition, the operations and effects of each of the embodiments and modified examples are merely a list of the most preferred operations and effects derived from the present invention, and the operations and effects according to the present invention is not limited to the ones described in each of the embodiments and modified examples.

It should be noted that, the entire contents of the Japanese Patent Application No. 2006-49060, filed on Feb. 24, 2006, and the Japanese Patent Application No. 2006-111299, filed on Apr. 13, 2006, are incorporated herein by reference.

INDUSTRIAL APPLICABILITY

As describe above, the radio communication terminal and the server according to the present invention is useful in radio communications such as mobile communications since the radio communication terminal and the server are capable of transmitting a message for a non-participating terminal to a non-participating terminal which is not participating in group call easily and conveniently.

The invention claimed is:

1. A radio communication terminal comprising:
    a group call processor that initiates group call with a plurality of specified members;
    wherein the radio communication terminal, during the group call, acquires information on currently non-participating specified members, wherein each of the currently non-participating specified members is a member among the specified members of the initiated group call;
    a destination setting processor that generates a destination selection screen including the currently non-participating specified members to select a destination during the group call; and
    a transmitter that transmits a message to one or more currently non-participating specified members selected by a user on a basis of a selection result in the destination selection screen by the user,
    wherein when the radio communication terminal acquires information on a non-participating member and the transmitter sets the destination for the message on the basis of the information on the non-participating member acquired by the radio communication terminal, prior to detection of a call end event of the group call and/or prior to receipt of an instruction to transmit the message, the radio communication terminal acquires information on a non-participating member again as a newly acquired destination when transmitting the message to the non-participating member, and displays information on a change between the set destination and the newly acquired destination by use of a display unit if there is a change.

2. The radio communication terminal according to claim 1, wherein
    the radio communication terminal acquires information on a non-participating member when detecting a call end event of the group call, and
    the transmitter sets the destination for the message, on the basis of the information on the non-participating member acquired by the radio communication terminal, and transmits the message to the non-participating member.

3. The radio communication terminal according to claim 1, wherein
    the radio communication terminal acquires information on a non-participating member when receiving an instruction to transmit the message, and
    the transmitter sets the destination for the message, on the basis of the information on the non-participating member acquired by the radio communication terminal, and transmits the message to the non-participating member.

4. The radio communication terminal according to claim 1, wherein when the radio communication terminal acquires information on a non-participating member and the transmitter sets the destination for the message on the basis of the information on the non-participating member acquired by the radio communication terminal, prior to detection of a call end event of the group call, the radio communication terminal acquires information on a non-participating member again as a newly acquired destination when transmitting the message to the non-participating member, and displays information on a change between the set destination and the newly acquired destination by use of a display unit if there is a change.

5. The radio communication terminal according to claim 1, wherein when the radio communication terminal acquires information on a non-participating member and the transmitter sets the destination for the message on the basis of the information on the non-participating member acquired by the radio communication terminal, prior to receipt of an instruction to transmit the message, the radio communication terminal acquires information on a non-participating member again as a newly acquired destination when transmitting the message to the non-participating member, and displays information on a change between the set destination and the newly acquired destination by use of a display unit if there is a change.

6. The radio communication terminal according to claim 1, wherein
    the message is a non-group call request message, and
    the group call is an established group call.

7. The radio communication terminal according to claim 1, wherein
    a generator generates a text-based message during the group call after completing establishment of the group call,
    the radio communication terminal further comprises a message coupler that receives another text-based message from another radio communication terminal corresponding to one of the specified members performing the group call, and couples the text-based message and the another text-based message into one coupled message, and
    the transmitter transmits the coupled message to at least one non-participating member.

8. The radio communication terminal according to claim 1, wherein the destination selection screen is displayed during the group call.

9. The radio communication terminal according to claim 1, wherein the specified members are all specified before the group call is initiated.

10. A server comprising:
    a group call processor that initiates group call with a plurality of specified members;
    wherein the server, during the group call, acquires information on currently non-participating specified members, wherein each of the currently non-participating specified members is a member among specified members of the initiated group call;
    a controller that sets a destination, on a basis of a user selection of a destination selection screen including the currently non-participating specified members during the group call; and
    a transmitter that transmits a message to the currently non-participating specified members,
    wherein when the server acquires information on a non-participating member and the transmitter sets the destination for the message on the basis of the information on the non-participating member acquired by the server, prior to detection of a call end event of the group call and/or prior to receipt of an instruction to transmit the message, the server acquires information on a non-participating member again as a newly acquired destination when transmitting the message to the non-participating member, and displays information on a change between the set destination and the newly acquired destination by use of a display unit if there is a change.

11. The server according to claim 10, wherein
the server acquires the information on a non-participating member when detecting a call end event of the group call, and
the transmitter sets the destination for the message, on the basis of the information on the non-participating member acquired by the server, and transmits the message to the non-participating member.

12. The server according to claim 10, wherein
the server acquires the information on a non-participating member when receiving an instruction to transmit the message, and
the transmitter sets the destination for the message, on the basis of the information on the non-participating member acquired by the server, and transmits the message to the non-participating member.

13. The server according to claim 10, wherein
the message is a non-group call request message, and
the group call is an established group call.

14. The server according to claim 10, wherein
a storage unit receives and stores a text-based message generated by a first radio communication terminal corresponding to one of the specified members performing the group call during group call after completing establishment of the group call,
the server further comprises a message coupler that receives another text-based message from another radio communication terminal corresponding to one of the specified members performing the group call, and couples the text-based message and the another text-based message into one coupled message, and
the transmitter transmits the coupled message to at least one non-participating member.

15. The server according to claim 10, wherein the destination selection screen is displayed during the group call.

16. The server according to claim 10, wherein the specified members are all specified before the group call is initiated.

* * * * *